United States Patent [19]

Matsuo

[11] Patent Number: 4,916,527
[45] Date of Patent: Apr. 10, 1990

[54] LUMINANCE SIGNAL/COLOR SIGNAL SEPARATION CIRCUIT

[75] Inventor: Yasutoshi Matsuo, Kawasaki, Japan

[73] Assignee: Victor Company of Japan, Ltd., Yokohama, Japan

[21] Appl. No.: 201,926

[22] Filed: Jun. 3, 1988

[30] Foreign Application Priority Data

Jun. 5, 1987 [JP] Japan .................. 62-140921

[51] Int. Cl.⁴ .................. H04N 9/78
[52] U.S. Cl. .................. 358/31
[58] Field of Search .................. 358/31

[56] References Cited

U.S. PATENT DOCUMENTS

| | | | |
|---|---|---|---|
| 4,524,382 | 6/1985 | Tanaka et al. | 358/31 |
| 4,570,177 | 2/1986 | Kondo et al. | 358/31 |
| 4,661,842 | 4/1987 | Ishige et al. | 358/31 |

FOREIGN PATENT DOCUMENTS

| | | | |
|---|---|---|---|
| 38087 | 3/1982 | Japan | 358/31 |
| 75991 | 5/1983 | Japan | 358/31 |
| 39184 | 3/1984 | Japan | 358/31 |
| 39185 | 3/1984 | Japan | 358/31 |
| 219886 | 11/1985 | Japan | 358/31 |

*Primary Examiner*—John W. Shepperd
*Attorney, Agent, or Firm*—Fleit, Jacobson, Cohn, Price, Holman & Stern

[57] ABSTRACT

A luminance signal/color signal separation circuit comprises a color signal separation circuit for obtaining a first color signal partially including luminance signal component from a composite image signal, a computation circuit for obtaining a second color signal including a color separation error signal by eliminating the luminance signal component from the first color signal to take out a signal of the second highest potential of the first and second color signals and a reference potential, thus to take out a third color signal excluding the color separation error signal, and a luminance signal separation circuit for obtaining a luminance signal from the composite signal and the third color signal. This circuit is constituted to first consider a signal which seems to be a C signal as a C signal once at least to effect computation between that signal and current line data, whereby when the result thereof indicates that considering that signal as C signal is correct, that signal is used as C signal, while when erroneous, that signal is not used as C signal. Thus, drawbacks, e.g., dot crawl of Y signal and/or half tone or color shift of C signal do not occur.

4 Claims, 6 Drawing Sheets

LUMINANCE SIGNAL/COLOR SIGNAL SEPARATION CIRCUIT

BACKGROUND OF THE INVENTION

This invention relates to a luminance signal/color signal separation circuit, and more particularly to a circuit for separating Y (luminance) signals and C (carrier chrominance) signals from a composite image signal e.g., in a VTR etc.

In a conventional Y/C separation circuit, a composite image signal (color bar signal) incoming to the input terminal is changed to a 1H delayed signal by a 1H delay circuit. The 1H delayed signal is subtracted from the composite image signal at the subtracter. The signal thus obtained further goes through a bandpass filter and a ½ amplifier and is than taken out from the C output terminal as a C signal. On the other hand, the composite image signal is delayed at Δt corresponding to the delay time of the bandpass filter at a Δt delay circuit. The C signal is subtracted from the Δt delayed signal at a subtracter and is then taken out from the Y output terminal as a Y signal.

However, such an image signal processing circuit has the problems that a thin color portion called a half amplitude portion occurs in the C signal, whereby color at vertical transition portions of a pictorial image is thinned or color fringe is shifted downward in the displayed picture, and that dot crawl due to C signal crosstalk occurs in the Y signal, resulting in considerably degraded picture quality. A further problem with this image signal processing circuit is that vertical resolution lowers in the reproduction of fine detail, etc. and thus shading in which color is changed to gray occurs, lacking clearness.

The truth table of the comb filter in the conventional circuit is shown in Table 1. In this Table, an asterisk indicates the half amplitude or the color shift of the C signal (dot crawl in the case of the Y signal), and a double asterisk indicates that a signal is considered as the C signal as a whole.

TABLE 1

| a | b | c |
|---|---|---|
| 0 | 0 | 0 |
| 1 | 0 | ½* |
| 0 | 1 | −½* |
| 1 | 1 | 0 |
| 1 | −1 | 1** |
| −1 | 1 | −1** |

SUMMARY OF THE INVENTION

An object of this invention is to provide a luminance signal/color signal separation circuit free from dot crawl in the Y signal and half amplitude and color shift of the C signal.

This invention provides a luminance signal/color signal separation circuit comprising: a color signal separation circuit for separating a composite image signal to obtain a first color signal partially including a luminance signal component; a first logic circuit for obtaining a second color signal including a color separation error signal by eliminating the luminance signal component from the first color signal; a second logic circuit for taking out a signal of the second highest potential from among the first color signal, the second color signal, and a reference potential to obtain a third color signal excluding the color separation error signal; and a luminance signal separation circuit for obtaining a luminance signal from the composite signal and the third color signal.

In place of implementation of Y/C separation by mean signal value as in the conventional comb filter, this invention is constituted to first assume a signal to be a C signal if it is seemingly a C (i.e. chrome content) signal for effecting computation between that signal and current line data, whereby when the result thereof indicates that the first assumption is correct, that signal is used as a C signal, while when the result thereof indicates that the first assumption of a C signal is erroneous, that signal is not used as the C signal. Namely, the C signal including the color separation error signal is subjected to error correction at the second logic circuit. In other words, a correct C signal output is taken out from the color signal partially including the luminance signal component and the C signal including the color separation error signal. Accordingly, dot crawl of the Y signal, half amptilude and color shift of the C signal, or the like does not occur at the vertical transition portion of a color bar signal, etc., thus making it possible to improve degradation of the vertical resolution which is otherwise produced with the conventional comb filter used in reproducing fine detail, etc. An arrangement can be realized with a relatively simple circuit, resulting in a small size and a low cost. Further, the circuit is simple because a control signal is not required in principle, with the result that no adjustment is required. In addition, since there is no portion which produces group delay except for the bandpass filter for the input, a large delay circuit for the time adjustment of the C signal is not required.

Other objects and features of this invention will be described with reference to the attached drawings.

DESCRIPTION OF THE PREFERRED EMBODIMENT

Figure 1:
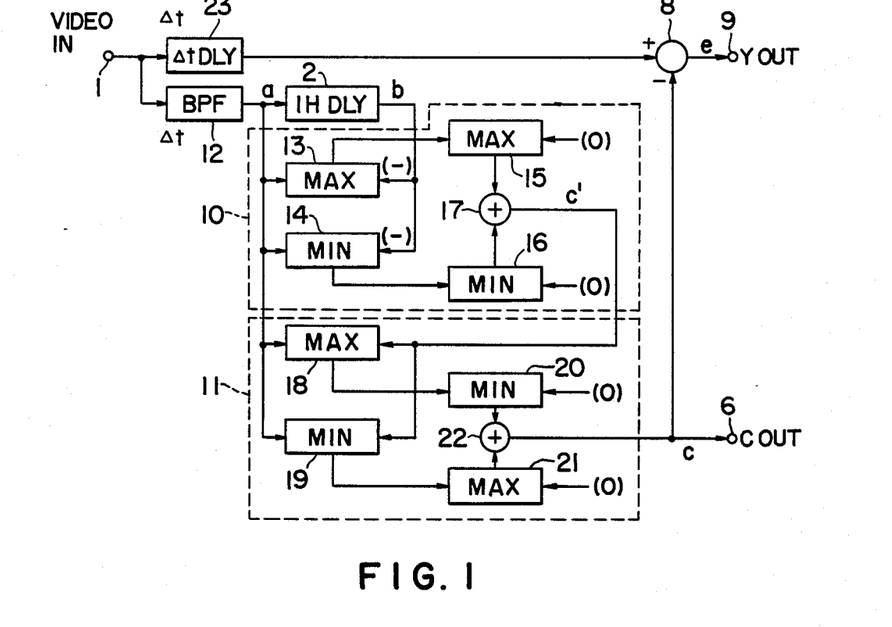
FIG. 1 is a block diagram of a first embodiment of a circuit according to this invention.

In FIG. 1, a first logic circuit 10 inputs a C signal a including a Y signal component and a signal b being delayed by 1H to output a color separation error signal c' as described later. A second logic circuit 11 inputs the C signal a including the Y signal component and the output signal c' from the first logic circuit 10 to output a C signal c from which the Y signal component is reduced.

Figure 2A:
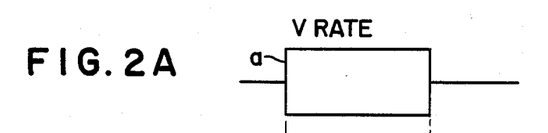
FIGS. 2A–E are views showing the signal waveforms of FIG. 1.
Figure 2B:
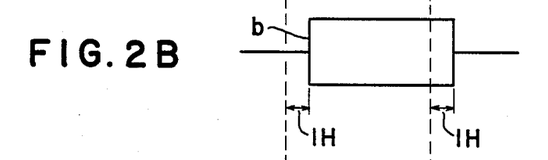
Figure 3A:
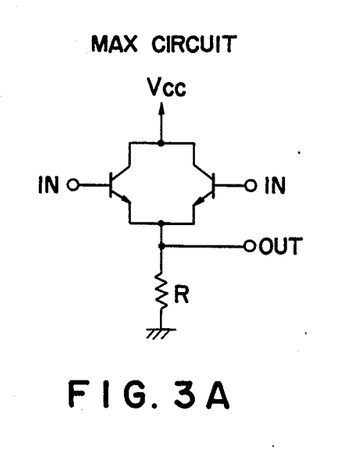
FIGS. 3A and B are actual circuit diagrams of MAX and MIN of FIG. 1.
Figure 3B:
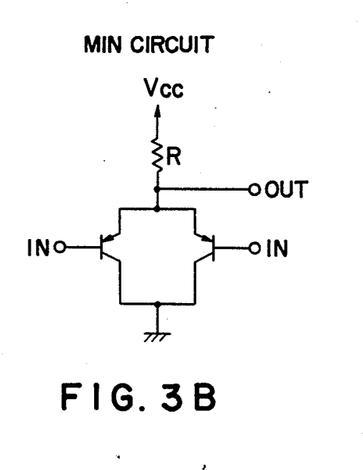

A composite image signal incoming to the terminal 1 is changed to a C signal a (including a Y signal component) (FIG. 2) at a bandpass filter 12. The C signal a is delivered to a high potential detection circuit (which will be referred to as "MAX" hereinafter) 13 and a low potential detection circuit (which will be referred to as "MIN" hereinafter) 14 of the first logic circuit 10, and, on the other hand, is subjected to 1H delay at a 1H delay circuit 2, resulting in a signal b (FIG. 2B). In this embodiment, MAX 13 is composed of a pair of npn transistors and a load resistor R connected in series between Vcc and ground as shown in FIG. 3A to output a higher potential of either the signal a or the signal b. In addition, the MIN 14 is composed of a load resistor R and a pair of pnp transistors connected in series between Vcc and ground as shown in FIG. 3B to output a lower potential of either the signal a or the signal b.

The output of the MAX 13 is delivered to a MAX 15, at which it is compared with 0 V. On the other hand, the output of the MIN 14 is delivered to a MIN 16, at which it is compared with 0 V. The MAX 15 is constituted as shown in FIG. 3A wherein when the output of the MAX 13 is above 0 V, it takes out an output from the circuit on the input side thereof (MAX 13, in the case). Further, the MIN 16 is constituted as shown in FIG. 3B wherein when the output of the MIN 14 is below 0 V, it takes out an output from the circuit on the input side thereof (MIN 14, in this case).

Figure 2C:
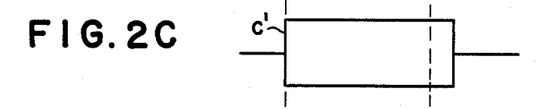

The output of the MAX 15 and the output of the MIN 16 are added at an adder 17, resulting in a signal c' (FIG. 2C). The relationship in respect of the MAX 15, the MIN 16 and the signal c' is shown in Table 2. It is to be noted that the combination indicated by the asterisk in this table does not occur actually.

TABLE 2

| MAX 15 | MIN 16 | c' |
|---|---|---|
| 0 | 0 | 0 |
| 1 | 0 | 1 |
| 0 | −1 | −1 |
| 1 | −1 | 0 |
| *{ 1 | 1 | |
| −1 | −1 | |

The truth table of the first logic circuit 10 is shown in Table 3. As apparent from this Table, in the case that signals a and b have the same level, or the same polarity, an input signal is considered as a Y signal to output 0, while in the case denoted by the asterisk except for the above, input signals are all considered as being the C signal (C signal including color separation error signal).

TABLE 3

| a | b | c' |
|---|---|---|
| 0 | 0 | 0 |
| 1 | 0 | 1* |
| 0 | 1 | −1* |
| 1 | 1 | 0 |
| 1 | −1 | 1* |
| −1 | 1 | −1* |

Figure 2D:
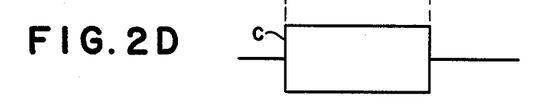
Figure 2E:
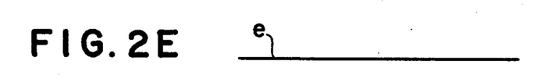

The signal c' and the signal a are delivered to a MAX 18 which has the same configuration as that of the MAX 13 and performs the same operation as that of the MAX 13, and, on the other hand, are delivered to a MIN 19 which has the same configuration as that of the MIN 14 and performs the same operation as that of the MIN 14. The output of the MAX 18 is delivered to a MIN 20 which has the same configuration as that of the MIN 16 and performs the same operation as that of the MIN 16, at which it is compared with 0 V. On the other hand, the output of MIN 19 is delivered to a MAX 21 which has the same configuration as that of the MAX 15 and performs the same operation as that of the MAX 15. Thus, the output of the MIN 20 and the output of the MAX 21 are added at an adder 22, from which the output thus added is taken out in a terminal C as a correct C signal c (FIG. 2D). By subtracting a signal from a Δt delay circuit 23 having a delay equal to the delay of the BPF 12 from the C signal c at a substracter 8, a Y signal e (FIG. 2E) is taken out to a terminal 9.

Data which seem to be C signal, which are indicated by an asterisk in Table 3 are all considered as being the C signal once at least at the first logic circuit 10. The second logic circuit 11 carries out error correction of such data.

It is generally known that where the C signal is obtained with a comb filter, if this C signal is completely correct, both the level and the phase thereof are in correspondence with those of the current line signal a, while if not correct, they are not both in correspondence with them (signals to which the asterisk is attached). The second logic circuit 11 obtains a correct C signal by making use of the characteristic mentioned above.

Namely, where the current line signal and the signal c' are in phase with each other, when $a \geq c'$, the signal c becomes the signal c', while when $a \leq c$, the signal c becomes the signal a. On the other hand, where the current line signal a and the signal c' are opposite in phase, signals C are all 0. In this instance, it is correct that "in-phase" implies that at least signal c' is considered as signal C, and it is correct that "opposite phase" implies that it is considered as the Y signal in the comb filter of the two line system having been described as the prior art. Thus, it cannot be said that the signal c' is a completely correct C signal when it is above the signal a in spite of being in-phase. In such a case, the second logic circuit 11 outputs the signal C with it having an amplitude suppressed to that of the signal a, thus to correct an error produced at the first logic circuit 10.

Figure 5:
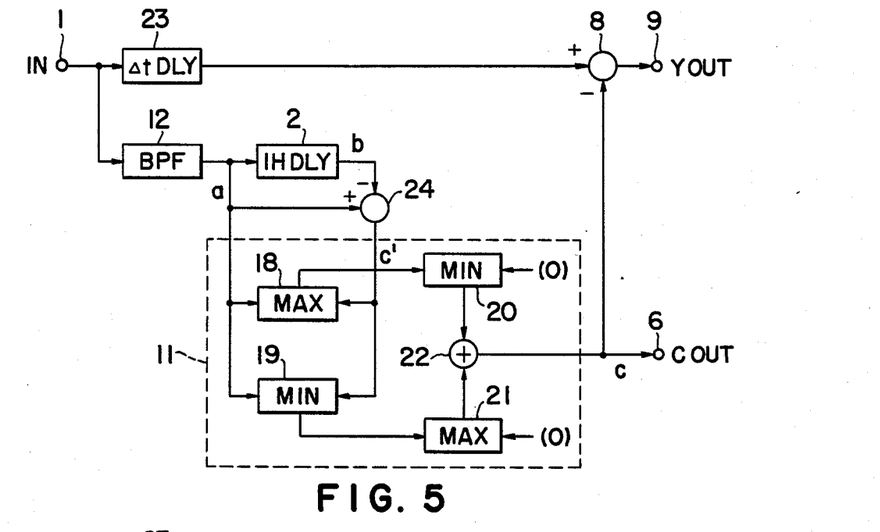
FIGS. 5 to 8 are block diagrams showing second to fifth embodiments of a circuit according to this invention.

The truth table indicating the operation of the second logic circuit 11 described above is shown in Table 4, and the C signal and Y signal taken out via the first and second logic circuits 10 and 11 are shown in Table 5. Namely, the second logic circuit 11 outputs the second highest potential of the signals a and c' and the reference potential. In FIG. 5, half amplitude of C signal or dot crawl of Y signal as in the conventional example (asterisk in Table 1) does not occur at the portion indicated by an asterisk, and color shift of the C signal or dot crawl of the Y signal as in the prior art does not occur at the portion indicated by the double asterisk.

TABLE 4

| a | c' | c |
|---|---|---|
| 0 | 0 | 0 |
| 1 | 0 | 0 |
| 0 | 1 | 0 |
| 1 | 1 | 1 |
| 1 | −1 | 0 |
| −1 | 1 | 0 |

TABLE 5

| a | b | c | y |
|---|---|---|---|
| 0 | 0 | 0 | 0 |
| 1 | 0 | 1 | 0* |
| 0 | 1 | 0 | 0** |
| 1 | 1 | 0 | 1 |
| 1 | −1 | 1 | 0 |

TABLE 5-continued

| a  | b | c  | y |
|----|---|----|---|
| −1 | 1 | −1 | 0 |

Figure 4:
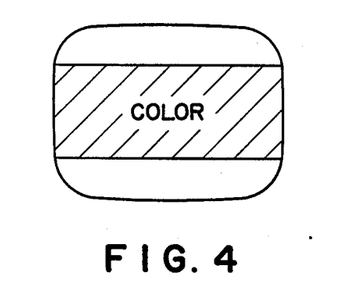
FIG. 4 shows a reproduced image of a color bar signal obtained by this invention.

Accordingly, as shown in FIG. 4, a high quality pictorial image free from color shift and/or dot crawl which have been encountered with the prior art can be obtianed. In addition, since 0 is output as signal c if no data exists in the current line signal a, there is no degradation of the vertical resolution in the case of reproducing fine detail or, thus making it possible to obtain a distinct pictorial image.

FIG. 5 is a block diagram showing a second embodiment of a circuit according to this invention. Like reference numerals are attached to the same components as those in FIG. 1 in this figure, respectively, and their explanation will be omitted. This circuit performs substantially the same operation as that of the first logic circuit 10 shown in FIG. 1 by subtracting signal b from signal a at a subtracter 24.

The truth table in this embodiment is shown in Table 6.

TABLE 6

| a  | b  | c′ | c  | y  |
|----|----|----|----|----|
| 0  | 0  | 0  | 0  | 0  |
| 1  | 0  | 1  | 1  | 0  |
| 0  | 1  | −1 | 0  | 0  |
| 1  | 1  | 0  | 0  | 1  |
| 1  | −1 | 2  | 1  | 0* |
| −1 | 1  | −2 | −1 | 0* |

In this Table, when the signal c′ is 2 (−2), the signal c is 1 (−1) at the portion indicated by an asterisk. This is because the second logic circuit 11 serves to output a smaller lever of the signals a and c′ when they are in phase with each other. This embodiment makes it possible to easily constitute the circuit as compared to that in the first embodiment.

Figure 6:
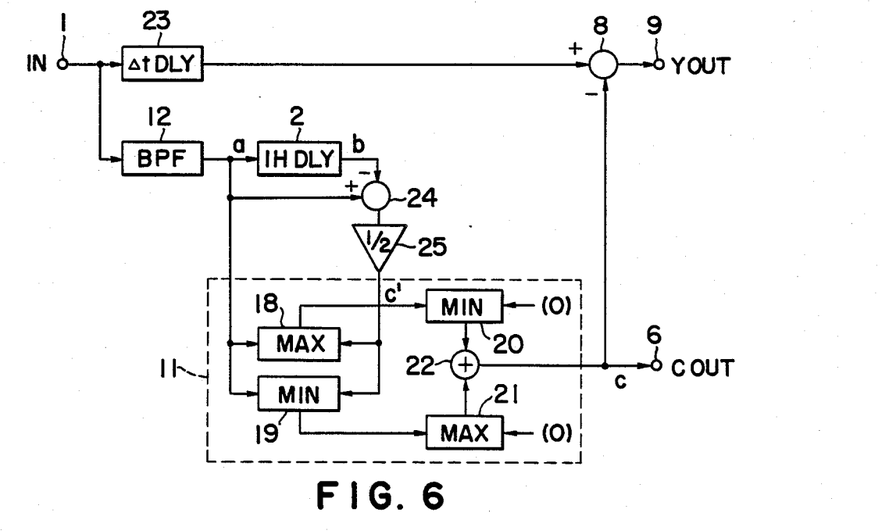

FIG. 6 is a block diagram showing a third embodiment of a circuit according to this invention. Like reference numerals are attached to the same components as those in FIGS. 1 and 5, respectively, in this figure and their explanation will be omitted. This circuit is constituted to reduce the output of the subtracter 24 to one-half by a ½ amplifier 25 to provide signal c′.

The truth table in this embodiment is shown in Table 7.

TABLE 7

| a  | b  | c′  | c  | y   |
|----|----|-----|----|-----|
| 0  | 0  | 0   | 0  | 0   |
| 1  | 0  | ½   | ½  | ½*  |
| 0  | 1  | −½  | 0  | 0   |
| 1  | 1  | 0   | 0  | 1   |
| 1  | −1 | 1   | 1  | 0   |
| −1 | 1  | −1  | 1  | 0   |

Since the C signal and Y signal both become equal to ½ at the portion indicated by an asterisk, dot crawl and half amplitude occur. Although such an image degradation occurs, there are less instances where image degradation occurs as compared to the prior art shown in Table 1.

Figure 7:
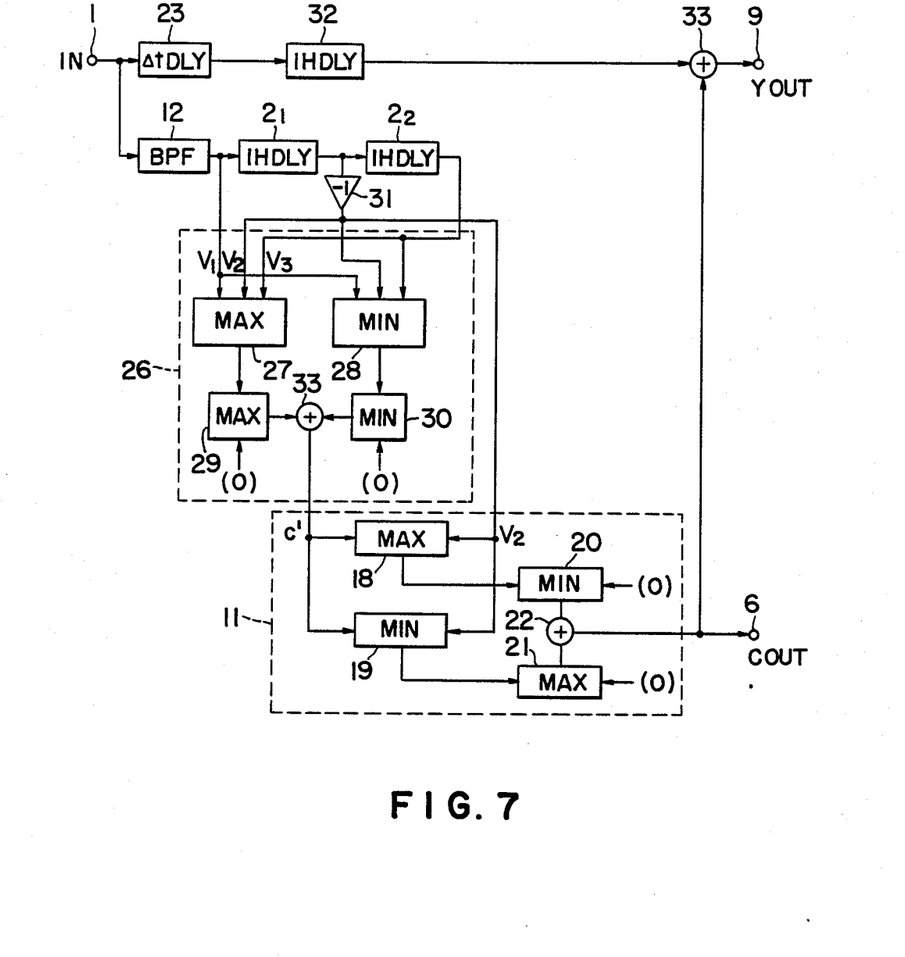

FIG. 7 is a block diagram showing a fourth embodiment of a circuit according to this invention. In this figure, like reference numerals are attached to the same components as those in FIG. 1 and their explanation will be omitted. Reference numeral 33 denotes an adder.

In this embodiment, there is employed a comb filter of the three line system using two 1H delay circuits ($2_1$, $2_2$). In this figure, reference numeral 26 denotes a first logic circuit. It is now assumed that an output of the bandpass filter 12 is $V_1$, a signal obtained by inverting the output of the 1H delay circuit $2_1$ using an inverting amplifier 31 is $V_2$, and an output of the 1H delay circuit $2_2$ is $V_3$. The first logic circuit 26 is composed of MAX 27 and MIN 28 to which these signals $V_1$, $V_2$ and $V_3$ are inputted, a MAX 29 for comparing an ouput of MAX 27 with 0 V, and a MIN 30 for comparing an output of the MIN 28 with 0 V. The truth table is shown in Table 8.

TABLE 8

| $V_1$ | $V_2$ | $V_3$ | c′ |
|-------|-------|-------|-----|
| 0     | 0     | 0     | 0   |
| 0     | 0     | 1     | 1*  |
| **0   | 1     | 0     | 1*  |
| **0   | 1     | 1     | 1*  |
| 1     | 0     | 0     | 1*  |
| 1     | 0     | 1     | 1*  |
| **1   | 1     | 0     | 1*  |
| **1   | 1     | 1     | 1*  |
| 1     | −1    | 1     | 0   |
| −1    | 1     | −1    | 0   |
| 0     | 1     | −1    | 0   |
| 0     | −1    | 1     | 0   |
| −1    | 1     | 0     | 0   |
| 1     | −1    | 0     | 0   |
| 1     | 0     | −1    | 0   |

In this table, the portions designated with an asterisk are those where the signals c′ are equal to 1 and are all considered as the C signal, and portions designated with double asterisks show the input state for outputting the correct C signal with the first and second logic circuits 26 and 11 being included.

The second logic circuit 11 is the same as that in FIG. 5 or 6 in construction, but differs from the latter in that it inputs the signal c′ and the signal $V_2$ to output a C signal. The truth table thereof is shown in Table 9.

TABLE 9

| c′ | $V_2$ | c  |
|----|-------|-----|
| 0  | 0     | 0   |
| 0  | 1     | 0   |
| 1  | 0     | 0   |
| 1  | 1     | 1*  |
| 1  | −1    | 0   |
| −1 | 1     | 0   |

In this Table, the portion designated with an asterisk shows a correct C signal. It is to be noted that 1H delay circuit 32 in the luminance signal route in FIG. 7 is provided for making a time adjustment of the input signal outputted from the Δt delay circuit 23 to be aligned with $V_2$.

Figure 8:
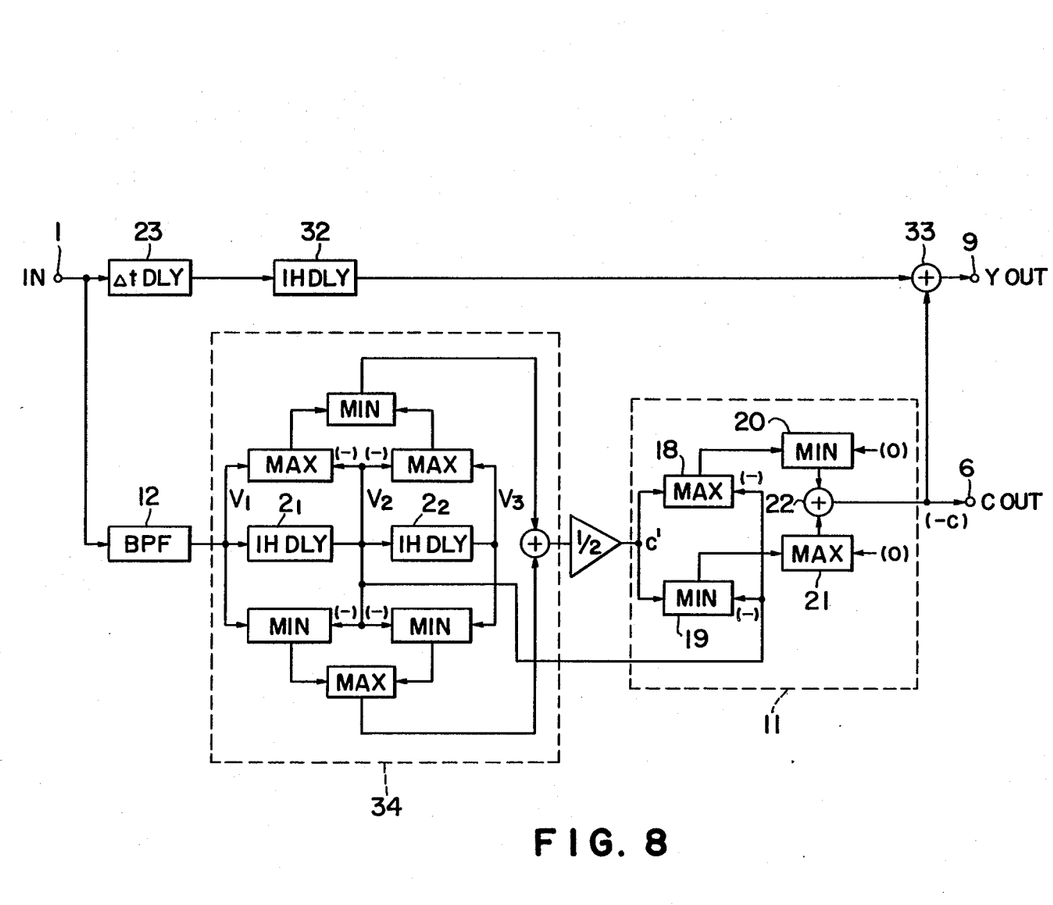

FIG. 8 is a block diagram showing a fifth embodiment of a circuit according to this invention. In this figure, like reference numerals are attached to the same components as those in FIGS. 1 and 7, respectively, and their explanation will be omitted. In this embodiment, the second logic circuit 11 is combined with logical comb filter 34 of the three line system conventionally known, thereby solving the problems with the conventional comb filter 34.

Figure 9A:
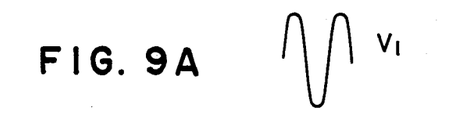
FIGS. 9A–D are views showing signal waveforms of FIG. 8.
Figure 9B:
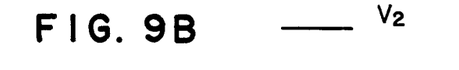
Figure 9C:
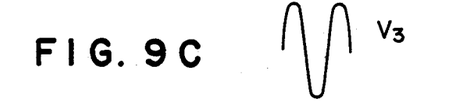
Figure 9D:
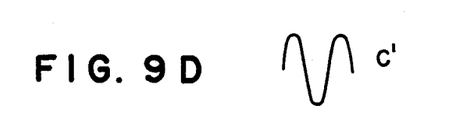

In FIG. 8, when it is assumed that an output of the bandpass filter 12 is $V_1$ (FIG. 9A), an output (current line) of IH delay circuit $2_1$ is $V_2$ having an amplitude of zero (FIG. 9B), and an output of 1H delay circuit $2_2$ is $V_3$, since the current line signal is the signal $V_2$ having an amplitude of zero, a C signal having an amplitude of zero must be outputted as the output of the comb filter 34. The logical comb filter 34 of the three line system provides more excellent improvement as compared to the logical comb filter of the two line system, but still leaves room for improvement in that the signal c' having an amplitude of one half of that of $V_1$ or $V_2$, as shown in FIG. 9D is taken out.

To overcome this, by connecting the second logic circuit 11 to the output of the comb filter 34, as in the above-described embodiment, the correct C signal can be outputted as its output. Thus, the C signal and the Y signal can be taken out as a signal having an amplitude of zero.

Figure 10A:
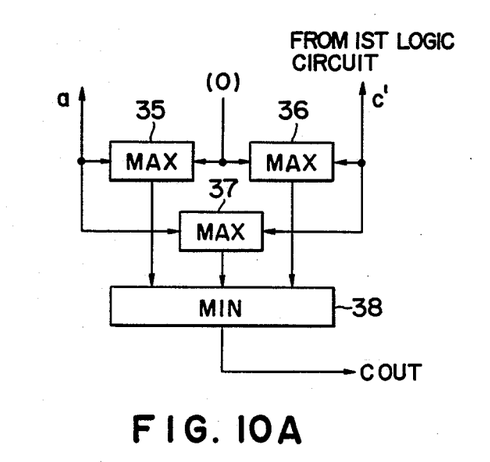
FIGS. 10A and B are block diagrams showing another embodiment of the second logic circuit.
Figure 10B:
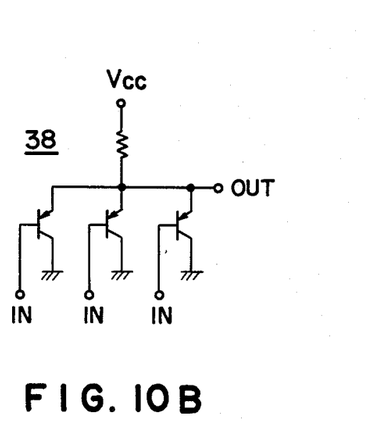

FIG. 10A shows another embodiment of the second logic circuit 11 and this circuit may be used in the above-described embodiments. This circuit serves to obtain the second highest of three input signals of the signals a and c' and the signal zero, and is composed of MAXs 35, 36 and 37, and a three input type MIN 38 having the circuit configuration shown in FIG. 10B.

In this circuit, by inputting zero to one input of the MAXs 35 and 36, three kinds of responses are carried out: ① when $c'>a>0$, the signal a is output, ② when $0>c'>a$, the signal c' is output, and ③ when $a>0>c'$, zero is output. This circuit performs the same oepration as that of the above-mentioned second logic circuit 11 to output the second highest potential of the signals a and c' and the reference potential.

By using the above-described second logic circuit with MAX and MIN provided therein being replaced with each other (reversed), the same results can be obtained.

What is claimed is:

1. A luminous signal/color signal separation circuit comprising:
    bandpass filtering means for separating from a composite image signal a first color signal partially including a luminance signal component;
    delay means for outputting as a second color signal, delayed first color signal obtained by delaying the first color signal by a time period which is an integer multiple of a horizontal scanning period;
    a first logic circuit for taking out signals of the highest potential from among the first and second color signals and a reference potential, and for algebraically adding the signals of the highest and lowest potentials from among the first and second color signals and the reference potential to obtain a third color signal including a color separation error signal;
    a second logic circuit for taking out a signal of the second highest potential from among said first and third color signals and a reference potential, thus to take out therefrom a fourth color signal excluding the color separation error signal; and
    an addition/subtraction means for generating a luminance signal from the composite image signal and said fourth color signal.

2. A luminance signal/color signal separation circuit as set forth in claim 1, wherein said second logic circuit comprises:
    a first higher potential output circuit for outputting a higher potential of said first and third color signals;
    a first lower potential output circuit for outputting a lower potential of said first and third signals;
    a second lower potential output circuit for outputting a lower potential of an output of said first higher potential output circuit and said reference potential;
    a second higher potential output circuit for outputting a higher potential of an output of said first lower potential output circuit and said reference potential; and
    a first coupling circuit for coupling an output of said second lower potential output circuit and an output of said second higher potetial output circuit to take out said fourth color signal excluding the color separation error components.

3. A luminance signal/color signal separation circuit as set forth in claim 2, wherein said first logic circuit comprises:
    a third higher potential output circuit for outputting a higher potential of said first color signal and said second color signal;
    a third lower potential output circuit for outputting a lower potential of said first color signal and said second color signal;
    a fourth higher potential output circuit for outputing a higher potential of an output of said third higher potential output circuit and said reference potential;
    a fourth lower potential output circuit for outputting a lower potential of an output of said third lower potential of an output of said third lower potential output circuit and said reference potential; and
    a second coupling circuit for coupling an output of said fourth higher potential output circuit and an output of said fourth lower potential output circuit to take out said third color signal.

4. A luminance signal/color signal separation circuit as set forth in claim 1, wherein said second logic circuit comprises:
    a first computation circuit for outputting a higher (or lower) potential of said first color signal and said reference potential;
    a second computation circuit for outputting a higher (or lower) potential of said third color signal and said reference potential;
    a third computation circuit for outputting a higher (or lower) potential of said first and third color signals; and
    a fourth computation circuit for outputting a lower (higher) of outputs of said first, second and third computation circuits, thus to take out said fourth color signal excluding the color separation error component.

* * * * *